Figure 4:
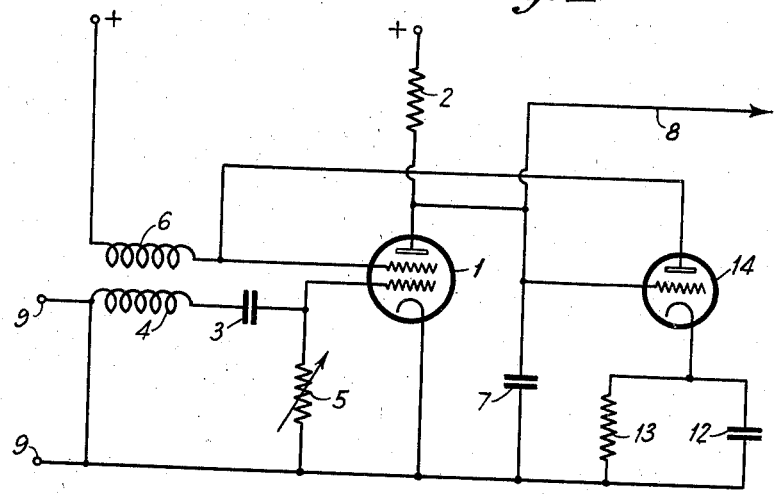

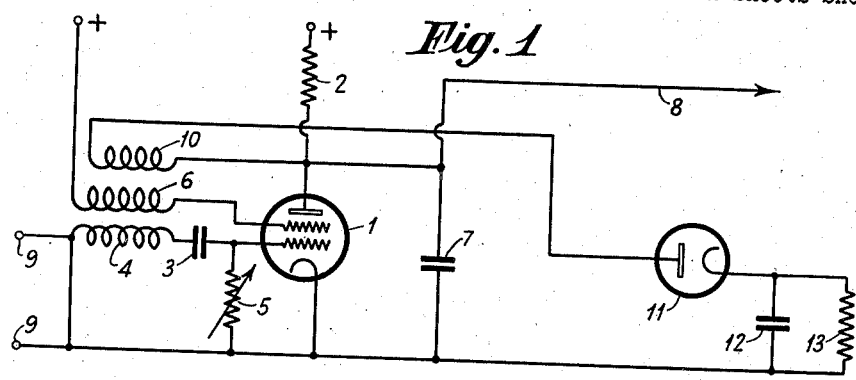
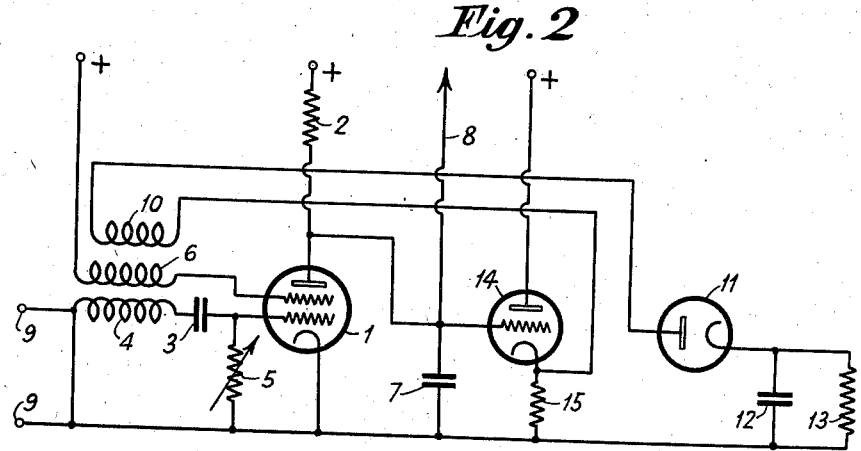
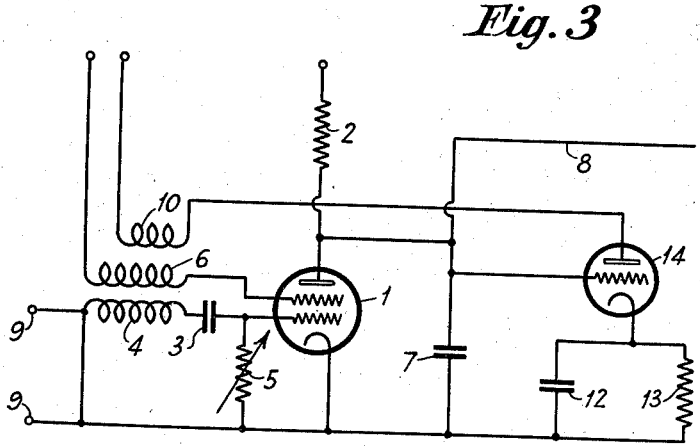

Aug. 2, 1938.  M. BOWMAN-MANIFOLD ET AL  2,125,732
OSCILLATION GENERATOR
Filed May 14, 1936  2 Sheets-Sheet 2

INVENTOR
MICHAEL BOWMAN-MANIFOLD
ROLF EDMUND SPENCER
BY
ATTORNEY

Patented Aug. 2, 1938

2,125,732

UNITED STATES PATENT OFFICE 2,125,732

OSCILLATION GENERATOR

Michael Bowman-Manifold, Worplesdon Station, and Rolf Edmund Spencer, London, England, assignors to Electric & Musical Industries Limited, Hayes, Middlesex, England, a corporation of Great Britain Application May 14, 1936, Serial No. 79,652
In Great Britain May 30, 1935

3 Claims. (Cl. 250—36)

The present invention relates to electric oscillation generators, and is particularly concerned with generators of the kind which are adapted to be controlled in frequency by synchronizing or other signals.

Among generators of the kinds referred to are generators of the reactance-resistance type, examples of which are blocking oscillators and multivibrators.

Reactance-resistance generators can be made to run very accurately in phase with applied synchronizing impulses, but it is usually found in practice that the natural frequency must be made considerably lower than the synchronous frequency. This is largely due to the fact that such generators usually comprise a discharge device such as a thermionic valve, the operating potentials of which may vary considerably in use. Thus in generators of this type, the natural frequency differs from the synchronous frequency, and in the absence of controlling impulses, the generator tends to run slow.

As an example of reactance-resistance generator, a blocking oscillator of a kind employed for synchronizing purposes in many television systems may be considered. A blocking oscillator comprises essentially a condenser arranged to charge up substantially rectilinearly through a resistance, and a thermionic valve so arranged that the condenser can discharge through the anode-cathode path of the valve. The control grid circuit of the latter comprises a condenser and leak resistance, which determine the natural frequency of the generator, and a reaction coupling is provided between the anode or screening grid circuit and the control grid circuit.

At the end of each cycle, the grid-circuit condenser receives a negative charge which biases the control grid to a potential more negative than that corresponding to anode current cut-off; this charge leaks away through the leak resistance, but before the grid potential reaches a value at which anode current can flow, a synchronizing impulse is usually applied to the grid in such a sense as to drive its potential in the positive direction and initiate the flow of anode current.

From the above description, it will be clear that the frequency of the saw-tooth oscillation set up across the anode-circuit condenser is lower in the absence of synchronizing impulses than when such impulses are present. That is to say, when the synchronizing impulses are absent, the oscillator runs slow. Furthermore, when the impulses recommence, several cycles elapse before the oscillator is once more held in synchronism. This is clearly a disadvantage in television systems, since it causes distortion of the reproduced picture, and it is an object of the present invention to avoid or reduce the tendency of oscillation generators of the kind specified, such, for example, as blocking oscillators, to run slow in the absence of synchronizing impulses.

According to the present invention, in a generator of the kind specified, having a natural frequency of $f_0$ cycles per second, which is adapted to be controlled by synchronizing or other signals of a different frequency of $f_1$ cycles per second, means are provided whereby, when the synchronizing signals cease, the generator is caused at least initially to run at a frequency closer to $f_1$ than to $f_0$.

According to a feature of the invention, in a generator of the kind specified, having a natural frequency of $f_0$ cycles per second, which is adapted to be controlled by synchronizing or other signals of a different frequency of $f_1$ cycles per second, there is provided a reactance adapted to be charged by said generator, the change in the energy stored in said reactance when, on account of the cessation of said synchronizing signals, said generator ceases to run at the frequency $f_1$, being employed to maintain the frequency of oscillation closer to $f_1$ than to $f_0$.

It will be clear that in a generator such as a blocking oscillator, for example, the potential to which the condenser across which the oscillation is generated charges up is higher in the absence of synchronizing impulses than when such impulses are present; that is, the oscillation is of greater amplitude as well as a lower frequency, and the present invention, in one aspect, makes use of this increase of amplitude.

According to a further feature of the present invention, in an oscillation generator comprising a condenser arranged to charge up from a source of potential and discharging means adapted to be controlled by applied impulses periodically to discharge said condenser, there are provided auxiliary means arranged to come into operation when the potential across said condenser exceeds a predetermined value to initiate the discharge of said condenser.

The discharging means may comprise a blocking oscillator valve; the auxiliary means referred to may take the form of a second condenser associated with a uni-directionally-conducting device, the arrangement being such that when the generator tends to run slow, a pulse of current flows into the second condenser, this pulse being utilized to initiate the discharge of the first condenser, for example by actuating the discharging means.

Several embodiments of the invention will now be described by way of example, with reference to the accompanying drawings, in which—

Figure 5:
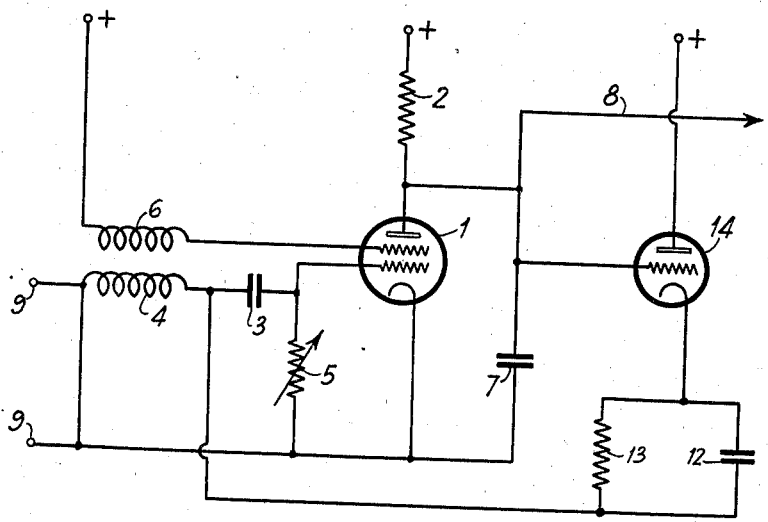

Figs. 1, 2 and 3 are circuit diagrams illustrating arrangements according to the invention, and Figs. 4 and 5 show modifications of the arrangement of Fig. 3.

Like parts in the several figures are given the same reference numerals.

Referring to Fig. 1, a blocking oscillator comprises a tetrode valve 1 having its anode connected through a resistance 2 to a source (not shown) of anode current, the negative terminal of which is connected to the cathode of the valve. The control grid of valve 1 is connected to its cathode through a condenser 3 and a coupling coil 4 in series, and through a variable leak resistance 5. The screening grid is connected through a coil 6 which is coupled to coil 4 to a point at a suitable positive potential in the anode current source.

Connected between the anode and cathode of valve 1 is a condenser 7 across which, in operation, a saw-tooth oscillation is generated; this oscillation is taken off by means of lead 8 and may be applied, for example, to an amplifying valve having the scanning coils of a cathode ray tube in its anode circuit. Synchronizing impulses may be fed to the valve 1 from terminals 9.

The anode of valve 1 is also connected through a coupling coil 10 to the anode of a diode valve 11, the cathode of which is connected to the cathode of valve 1 through a condenser 12 shunted by a high-resistance leak 13.

The operation of this arrangement is as follows: As the condenser 7 charges up, the condenser 12 also charges up through diode 11, the charge on condenser 12 leaking away relatively slowly through the high resistance leak 13. During every cycle of charging of condenser 7, condenser 12 receives a charge, and eventually a steady state is reached in which the generator is running at synchronous speed under the control of applied synchronizing impulses, condenser 12 receiving charge only at the peaks of the saw-tooth oscillation set up across condenser 7.

If now the generator tends to run slow, due for example to cessation of the synchronizing impulses, the amplitude of the saw-tooth oscillation tends to increase, and at the peak of the first uncontrolled cycle of oscillation, a pulse of charging current of a value greater than the average steady state value flows to the condenser 12. This pulse of current flows through winding 10, which is coupled to winding 4, and there is thus induced in the control grid circuit of valve 1 a voltage pulse which is arranged to drive the control grid in the positive sense, thus initiating the flow of current in valve 1. The generator is thus prevented from oscillating at a frequency substantially less than the synchronous frequency.

In some cases, it is found necessary to amplify the pulse produced by the flow of charging current to condenser 12 when the generator tends to run slow, before applying it to the grid circuit of valve 1. Fig. 2, however, shows a modification of the arrangement of Fig. 1 in which such amplification is usually unnecessary.

Referring to Fig. 2, the anode of valve 1 is connected to the control grid of a triode valve 14 having its anode connected to a point at a suitable positive potential in the anode current source, and its cathode connected to the cathode of valve 1 through a resistance 15. The cathode of valve 14 is connected to the anode of diode 11 through coil 10. The potential of the cathode of valve 14 follows that of the control grid, and by a suitable choice of the value of resistance 15, the range of grid potential variation. The operation of this arrangement is substantially the same as that of the arrangement of Fig. 1, but the condenser 12 and resistance 13 may be made of lower impedance, and the current pulses in the diode will be larger.

In the modification shown in Fig. 3, the diode 11 is omitted and the condenser 12 and high-resistance leak 13 are connected in the cathode circuit of valve 14, the anode of which is connected to a point in the anode current source through coupling coil 10. It is arranged that, in the steady state referred to above, the grid of the valve 14 is biased relative to its cathode by the charge on condenser 12 to a potential just greater than that corresponding to anode current cut-off, and current accordingly flows in the valve 14 on the peaks of the saw-tooth oscillation. When the generator tends to run slow, the current in valve 14 tends to increase, and the resultant pulse in the coil 10 is arranged to initiate the flow of current in valve 1.

The coupling coil 10 may be dispensed with, the anode of valve 14 being connected to the screening grid of valve 1, as shown in Fig. 4. In this arrangement, when a pulse of current of sufficient amplitude flows in the valve 14, the potential of the screening grid of valve 1 is made less positive to an extent sufficient to initiate the flow of current in valve 1.

In a further modification of Fig. 3, shown in Fig. 5, the end of condenser 12 remote from the cathode of valve 14 is connected to the control grid end of coil 4, the anode of valve 14 being connected as before to a point in the anode current source. When current flows in the valve 14, the control grid of valve 1 is given a positive pulse, which can initiate the flow of current in valve 1.

Since in practice the condenser 12 is an effective short circuit to the blocking oscillation generated between the control and screening grids of valve 1, the coil 4 may, if desired, also be connected in series between the cathode of the valve 14 and the cathode side of the condenser 12, the other side of the latter being in this case connected directly to the cathode of valve 1.

In all cases, the time constant of the condenser and resistance 12, 13 should be so chosen that only a small charge is lost by condenser 12 during each cycle, and so that the charge lost is replaced during a small fraction only, that is, during the peak, of each cycle. In other words, the leak resistance 13 should in practice be given a suitable high value. Furthermore, in the case of a generator employed for the generation of line frequency oscillations in a television system, if for any reason the condenser 12 receives an excess charge when a framing impulse is received, the time constant of circuit 12, 13 must be such that the whole of this excess charge is dissipated before the next framing impulse is received.

Although for convenience the application of the invention to blocking oscillators has been described, it is to be understood that the invention is not so limited, but can be applied to many other forms of generator, such for example as those in which grid-controlled gas-filled discharge tubes are employed periodically to discharge a condenser.

We claim:

1. An oscillation generator comprising an electron discharge tube certain electrodes of which are interconnected through a reactance and a resistor, said generator being independently operable to deliver impulses at a predetermined natural frequency, a source of driving impulses of a second predetermined frequency higher than the frequency first mentioned, means responsive to impulses from said source for driving said generator synchronously therewith, and means including a uni-directionally conductive device in circuit with said reactance-resistor combination for increasing the natural frequency of said generator to a value commensurate with that of said second predetermined frequency, the last said means being responsive to a failure of the first said means to receive the driving impulses.

2. A blocking oscillator having a characteristic such that it operates independently to deliver impulses at a predetermined cyclic frequency slower than a certain frequency at which it is intended to be driven from an outside source of synchronizing signals, a reactance-resistance combination in circuit with said oscillator, means cooperative with said oscillator and with said outside source for causing cyclic charges of a predetermined value to be built up on said reactance, thereafter to be discharged through said resistance, and means rendered operable by a cessation of signals from said source whereby the reactance-resistance combination is caused to accelerate the oscillator above its predetermined independent frequency.

3. A blocking oscillator having a characteristic such that it operates independently to deliver impulses at a predetermined cyclic frequency slower than a certain frequency at which it is intended to be driven from an outside source of synchronizing signals, a reactance-resistance combination in circuit with said oscillator, means co-operative with said oscillator and with said outside source for causing cyclic charges of a predetermined value to be built up on said reactance, thereafter to be discharged through said resistance, a unidirectional conducting device, means including a second reactance-resistance combination in circuit with said unidirectional conducting device, the last said means being rendered operable by the cessation of signals from said source to cause an impulse of current to pass through said unidirectional conducting device, and means rendered simultaneously operable to apply said impulse to said reactance-resistance combination in circuit with said oscillator.

MICHAEL BOWMAN-MANIFOLD.
ROLF EDMUND SPENCER.